United States Patent
Millich et al.

(10) Patent No.: US 10,612,477 B2
(45) Date of Patent: Apr. 7, 2020

(54) METHOD FOR CALCULATING A RESIDUAL GAS MASS IN A CYLINDER OF AN INTERNAL COMBUSTION ENGINE AND CONTROLLER

(71) Applicant: Volkswagen Aktiengesellschaft, Wolfsburg (DE)

(72) Inventors: Elmar Millich, Berlin (DE); Lars Petersen, Meinersen (DE); Andre Shurkewitsch, Calberiah (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/067,464

(22) PCT Filed: Jan. 30, 2017

(86) PCT No.: PCT/EP2017/051909
§ 371 (c)(1),
(2) Date: Jun. 29, 2018

(87) PCT Pub. No.: WO2017/134003
PCT Pub. Date: Aug. 10, 2017

(65) Prior Publication Data
US 2019/0017449 A1    Jan. 17, 2019

(30) Foreign Application Priority Data
Feb. 3, 2016    (DE) .................. 10 2016 201 650

(51) Int. Cl.
*F02D 35/02*    (2006.01)
*F02D 41/00*    (2006.01)
(Continued)

(52) U.S. Cl.
CPC ......... *F02D 35/02* (2013.01); *F02D 41/0062* (2013.01); *F02D 41/1401* (2013.01);
(Continued)

(58) Field of Classification Search
CPC .. F02D 35/02; F02D 41/1401; F02D 41/0062; F02D 41/1446; F02D 2041/1433; F02D 13/0261; Y02T 10/47
(Continued)

(56) References Cited

U.S. PATENT DOCUMENTS

| 6,550,451 B1 * | 4/2003 | Muller ............... F02D 41/0062 123/406.45 |
| 6,850,831 B2 * | 2/2005 | Buckland ............ F02D 41/0062 123/568.14 |

(Continued)

FOREIGN PATENT DOCUMENTS

| DE | 103 32 107 B4 | 1/2004 |
| DE | 103 49 676 A1 | 5/2004 |

(Continued)

OTHER PUBLICATIONS

International Search Report of PCT Application No. PCT/EP2017/051909, dated Apr. 7, 2017.
(Continued)

*Primary Examiner* — Sizo B Vilakazi
*Assistant Examiner* — Brian R Kirby
(74) *Attorney, Agent, or Firm* — Pearl Cohen Zedek Latzer Baratz LLP

(57) ABSTRACT

A method of calculating a residual gas mass in a cylinder of an internal combustion engine, wherein the cylinder has at least one intake valve and one exhaust valve, comprising: obtaining a cylinder residual gas mass base value that is based on a predefined model; determining a first cylinder residual gas mass value that indicates a cylinder residual gas
(Continued)

mass remaining in the cylinder clearance volume after an expulsion of exhaust gas; determining a second cylinder residual gas mass value that indicates a cylinder residual gas mass flowing into the cylinder due to a valve overlap of the intake valve and the exhaust valve, wherein the second cylinder residual gas mass value is determined based on the cylinder residual gas mass base value and the first cylinder residual gas mass value; and calculating the residual gas mass in the cylinder, based on the first and second cylinder residual gas mass values.

3 Claims, 2 Drawing Sheets

(51) Int. Cl.
  *F02D 41/14*   (2006.01)
  *F02D 13/02*   (2006.01)

(52) U.S. Cl.
  CPC ...... *F02D 41/1446* (2013.01); *F02D 13/0261* (2013.01); *F02D 2041/1433* (2013.01); *Y02T 10/47* (2013.01)

(58) Field of Classification Search
  USPC .......................................................... 701/103
  See application file for complete search history.

(56) References Cited

U.S. PATENT DOCUMENTS

| | | | | |
|---|---|---|---|---|
| 6,999,864 | B2* | 2/2006 | Iizuka | F02D 35/023 |
| | | | | 701/103 |
| 7,181,332 | B1* | 2/2007 | Vick | F02D 41/1445 |
| | | | | 123/316 |
| 7,685,871 | B2* | 3/2010 | Sinnamon | G01M 15/106 |
| | | | | 73/114.69 |
| 7,689,345 | B2 | 3/2010 | Wiggins et al. | |
| 2001/0011541 | A1* | 8/2001 | Kawasaki | F01L 9/04 |
| | | | | 123/568.14 |
| 2004/0015287 | A1* | 1/2004 | Ilzuka | F02D 41/1401 |
| | | | | 701/102 |
| 2004/0079332 | A1 | 4/2004 | Kotwicki | |
| 2004/0139949 | A1* | 7/2004 | Koseki | F01L 1/20 |
| | | | | 123/568.14 |
| 2006/0107924 | A1* | 5/2006 | Miyanoo | F02D 13/0215 |
| | | | | 123/406.19 |
| 2008/0000462 | A1* | 1/2008 | Ishibashi | F02D 35/023 |
| | | | | 123/672 |
| 2009/0076703 | A1* | 3/2009 | Wiggins | F02D 41/0062 |
| | | | | 701/102 |
| 2010/0095933 | A1* | 4/2010 | Moriya | F01N 3/0814 |
| | | | | 123/435 |
| 2010/0185380 | A1* | 7/2010 | Katou | F02D 13/0211 |
| | | | | 701/103 |
| 2011/0168130 | A1* | 7/2011 | Kang | F02D 41/0062 |
| | | | | 123/295 |
| 2012/0143476 | A1* | 6/2012 | Hagner | F02D 41/0007 |
| | | | | 701/103 |
| 2013/0245967 | A1* | 9/2013 | Hagari | F02D 41/18 |
| | | | | 702/45 |
| 2014/0000554 | A1 | 1/2014 | Tsuyuki et al. | |
| 2014/0007855 | A1* | 1/2014 | Kosaka | F02D 41/02 |
| | | | | 123/568.21 |
| 2014/0172278 | A1* | 6/2014 | Kosaka | F02D 41/0062 |
| | | | | 701/108 |
| 2014/0230780 | A1* | 8/2014 | Larimore | F02D 41/0062 |
| | | | | 123/319 |
| 2014/0373814 | A1* | 12/2014 | Herold | F02D 41/0007 |
| | | | | 123/51 B |
| 2015/0136097 | A1* | 5/2015 | Hoshi | F02D 19/0615 |
| | | | | 123/575 |
| 2015/0330326 | A1 | 11/2015 | Shaver et al. | |
| 2015/0361916 | A1* | 12/2015 | Kang | F02D 41/0062 |
| | | | | 123/90.17 |
| 2016/0169142 | A1* | 6/2016 | Klingbeil | F02D 19/0692 |
| | | | | 123/435 |
| 2016/0186676 | A1* | 6/2016 | Burkhardt | F02D 41/0002 |
| | | | | 123/435 |
| 2016/0377002 | A1* | 12/2016 | Hoffmeyer | F02D 41/2416 |
| | | | | 123/90.15 |
| 2016/0377043 | A1* | 12/2016 | Wang | G05B 15/02 |
| | | | | 701/111 |
| 2017/0030273 | A1* | 2/2017 | Jin | F02D 41/0062 |
| 2017/0051684 | A1* | 2/2017 | Lahti | F02D 41/1446 |

FOREIGN PATENT DOCUMENTS

| | | |
|---|---|---|
| DE | 10 2005 055 952 A1 | 5/2007 |
| DE | 10 2007 023849 A1 | 11/2008 |
| DE | 10 2008 046 930 B4 | 5/2009 |
| DE | 10 2013 225 452 A1 | 6/2014 |
| DE | 10 2013 216073 A1 | 2/2015 |
| DE | 10 2014 000 396 A1 | 7/2015 |
| EP | 2 162 802 A1 | 3/2010 |
| JP | 2014015859 A | 1/2014 |
| JP | 5 826346 B1 | 2/2015 |

OTHER PUBLICATIONS

Office Action for Korean Patent Application No. 10-2018-7019217, dated Jul. 1, 2019.
Search Report for German Patent Application No. 10 2016 201 650.4, dated Apr. 8, 2016.
J. W. Fox et al. "A model for predicting residual gas fraction in spark-ignition engines." SAE Technical Papers (931025), 1993.

* cited by examiner

METHOD FOR CALCULATING A RESIDUAL GAS MASS IN A CYLINDER OF AN INTERNAL COMBUSTION ENGINE AND CONTROLLER

CROSS-REFERENCE TO RELATED APPLICATIONS

This application is a National Phase Application of PCT International Application No. PCT/EP2017/051909, International Filing Date Jan. 30, 2017, claiming priority of German Patent Application No. 10 2016 201 650.4, filed Feb. 3, 2016, which is hereby incorporated by reference.

FIELD OF THE INVENTION

The invention relates to a method for calculating a residual gas mass in a cylinder of an internal combustion engine, and a controller that is configured for carrying out the method.

BACKGROUND OF THE INVENTION

In internal combustion engines, it is known that during operation a certain residual gas mass remains in the cylinder, i.e., even after combustion and during opening of an exhaust valve of the cylinder. The residual gas, or also the cylinder residual gas, is formed by exhaust gas.

It is known that the cylinder residual gas mass may be composed of various portions. On the one hand, a cylinder typically has a cylinder clearance volume that is always filled with cylinder residual gas and is not emptied. On the other hand, so-called internal exhaust gas recirculation is known in which, as the result of a (desired) valve overlap, i.e., an intake and exhaust valve (or valves) that are open at the same time, exhaust gas passes from an exhaust tract (exhaust manifold, for example) via the combustion chamber of the cylinder and into an intake tract (intake manifold, for example). The residual gas mass in the cylinder may be further increased in this way.

The cylinder residual gas mass calculated in an engine control unit is typically crucial for precisely determining the cylinder air mass, whose detection as accurately as possible is the prerequisite for stoichiometric fuel injection. A stoichiometric air-fuel ratio may be used to reduce the exhaust emissions after appropriate exhaust gas aftertreatment.

For physical models as well as parameterized models, measured parameters and model parameters, such as the speed of the internal combustion engine, the phase position of a camshaft, a valve position, and the like, are typically included in the calculation of the cylinder residual gas mass. In addition, the exhaust gas temperature is also typically included as a parameter in such models.

It is known that data for the parameters may be input on an engine-specific basis by the use of stationary engine test stand measurements under standard conditions. However, during dynamic operation of an internal combustion engine, insufficient thermal relaxation times in the exhaust gas temperatures or the like, due to ignition angle interventions, may result in deviations from the measured stationary operation, so that the calculated cylinder residual gas mass may become inaccurate.

For physical models as well as parameterized models, it is known to take into account deviating exhaust gas temperatures by the engine-specific input of data parameters in the overall model for calculating the cylinder residual [gas] mass, which, however, is typically complicated and may require high computing power and a large memory.

It is also known from German unexamined patent application DE 10 2005 055 952 A1 that the relationship between air charging in a combustion chamber of a cylinder and a measured intake manifold pressure is not linear. To obtain a simple, accurate determination of the air mass present in the combustion chamber, the unexamined patent application proposes to determine a residual gas partial pressure of the residual gas present in the combustion chamber. In addition, the air partial pressure of the air present in the combustion chamber is determined as a function of the residual gas partial pressure. The air mass in the combustion chamber is then determined as a function of the residual gas partial pressure.

The methods known in the prior art for determining the residual gas mass, which are based on parameterized models, for example, have the disadvantage that the number of model input parameters generally exponentially increases the memory and computing requirements for the engine control unit. When exhaust gas temperatures that deviate from those in stationary operation are taken into account, the level of measurement and application effort increases.

SUMMARY OF THE INVENTION

The object of the present invention is to provide an improved method for calculating a residual gas mass in a cylinder of an internal combustion engine, and a controller that is configured for carrying out the method, which at least partially overcome the above-mentioned disadvantages.

This object is achieved by the method according to the invention according to claim 1, and the controller according to claim 10.

According to a first aspect, the invention provides a method for calculating a residual gas mass in a cylinder of an internal combustion engine, wherein the cylinder has at least one intake valve and one exhaust valve, comprising:

a. obtaining a cylinder residual gas mass base value that is based on a predefined model;

b. determining a first cylinder residual gas mass value that indicates a cylinder residual gas mass remaining in the cylinder clearance volume after an expulsion of exhaust gas;

c. determining a second cylinder residual gas mass value that indicates a cylinder residual gas mass flowing into the cylinder due to a valve overlap of the intake valve and the exhaust valve, wherein the second cylinder residual gas mass value is determined based on the cylinder residual gas mass base value and the first cylinder residual gas mass value; and d. calculating the residual gas mass in the cylinder, based on the first and second cylinder residual gas mass values.

According to a second aspect, the invention provides a controller for an internal combustion engine of a motor vehicle, which includes a processor and a memory and which is configured for carrying out the method according to the first aspect.

Further advantageous aspects of the invention result from the subclaims and the following description of preferred exemplary embodiments of the present invention.

A method according to the invention for calculating a residual gas mass in a cylinder of an internal combustion engine, wherein the cylinder has at least one intake valve and one exhaust valve, comprises:

a. obtaining a cylinder residual gas mass base value that is based on a predefined model;
b. determining a first cylinder residual gas mass value that indicates a cylinder residual gas mass remaining in the cylinder clearance volume after an expulsion of exhaust gas;
c. determining a second cylinder residual gas mass value that indicates a cylinder residual gas mass flowing into the cylinder due to a valve overlap of the intake valve and the exhaust valve, wherein the second cylinder residual gas mass value is determined based on the cylinder residual gas mass base value and the first cylinder residual gas mass value; and
d. calculating the residual gas mass in the cylinder, based on the first and second cylinder residual gas mass values.

In principle, the internal combustion engine may be any given internal combustion engine, such as a gasoline engine, diesel engine, etc., and may have any given number of cylinders (1, 2, 3, 4, 5, etc.).

Each cylinder of the internal combustion engine typically has (at least) one intake valve and one exhaust valve. In addition, the cylinder has a combustion chamber in which the combustion of the fuel-air mixture takes place. Furthermore, the cylinder typically has a clearance volume that is specified by the design and type of operation. This is known to those skilled in the art.

Combustion air flows through the intake valve and into the cylinder, i.e., into the combustion chamber of the cylinder, and the exhaust gas that results from combustion flows through the exhaust valve and out of the cylinder.

An intake tract, such as an intake manifold or the like, may be provided upstream from the intake valve so that air may flow from the intake tract through the intake valve.

Similarly, an exhaust tract, such as an exhaust manifold or the like, into which the exhaust gas flows from the cylinder into the exhaust tract may be provided downstream from the exhaust valve.

When there is valve overlap, the intake valve and the exhaust valve are open at the same time, so that, as mentioned at the outset, exhaust gas may flow from the exhaust tract, through the exhaust valve into the combustion chamber, and from there through the open intake valve and into the intake tract. This exhaust gas may then pass into the combustion chamber once again during the next stroke.

As mentioned at the outset, knowledge of the residual gas present in the combustion chamber is important for a stoichiometric air/fuel ratio in the combustion chamber.

For calculating a residual gas mass in a cylinder, the method provides that initially a cylinder residual gas mass base value is obtained which is based on a predefined model. The cylinder residual gas mass base value may, for example, be stored in advance in a memory of a controller (for example, an engine control unit or the like) that carries out the method, or obtained by retrieval via an interface (bus interface, network interface, or the like).

In some exemplary embodiments, obtaining the cylinder residual gas mass base value also includes calculating and/or determining same.

The cylinder residual gas mass base value may be obtained by operating a given, specified internal combustion engine in a stationary state under standard conditions, for example on a test stand.

Parameters of the internal combustion engine that are thus obtained, for example exhaust gas temperature, speed, intake manifold pressure, phase position of the camshaft for certain intake valve and exhaust valve positions, valve position, exhaust gas back pressure, temperature of the internal combustion engine, and intake air temperature may be used to adapt a particular engine model to the internal combustion engine. The cylinder residual gas mass base value for an associated exhaust gas temperature may be determined using the engine model that is adapted in this way. This determination of the cylinder residual gas mass base value may take place using a very complex, and thus also very accurate, model, so that the cylinder residual gas mass base value determined in this way likewise has high accuracy. Since the use of such a complex engine model typically requires very high computing power, in some exemplary embodiments the calculation is carried out not by an engine control unit or the like, but, rather, by an appropriately high-powered computer that is external to the motor vehicle.

In some exemplary embodiments, the cylinder residual gas mass base value is also obtained by appropriate measurement of an internal combustion engine that is operated under standard test stand conditions, for example.

Furthermore, it is provided to determine a first cylinder residual gas mass value that indicates a cylinder residual gas mass remaining in the cylinder clearance volume after an expulsion of exhaust gas. This first cylinder residual gas mass value may be based, for example, on a provided model or a function or the like, as is also basically known to those skilled in the art. In some exemplary embodiments, this determination may be made in a controller such as an engine control unit. In some exemplary embodiments, the first cylinder residual gas mass value may also be calculated based on the cylinder residual gas mass base value.

In addition, it is provided to determine a second cylinder residual gas mass value that indicates a cylinder residual gas mass flowing into the cylinder when there is a valve overlap of the intake valve and the exhaust valve, wherein the second cylinder residual gas mass value is determined based on the cylinder residual gas mass base value and the first cylinder residual gas mass value. Since in some exemplary embodiments the cylinder residual gas mass base value and the first cylinder residual gas mass value may both be determined relatively accurately, the second cylinder residual gas mass value determined in this way also has relatively high accuracy.

Lastly, the (instantaneous or dynamic) residual gas mass in the cylinder, for example for an instantaneous exhaust gas temperature and/or an instantaneous stroke, an instantaneous valve position, or the like may be calculated based on the first and second cylinder residual gas mass values. This calculation may likewise be made in a controller such as an engine control unit.

As a result of the cylinder residual gas mass base value in particular having high accuracy, the first and/or second cylinder residual gas mass value(s) may also be determined with high accuracy, so that ultimately, the calculated residual gas mass in the cylinder likewise has high accuracy. In addition, removing the influence of the exhaust gas under dynamic conditions from the parameterized model under stationary conditions reduces the memory requirements and computing time in the engine control unit, for example. Furthermore, in some exemplary embodiments, additional measurement and application effort is not necessary, since the correction of the residual gas mass in the cylinder during dynamic operation may take place based on physical laws.

In some exemplary embodiments, the second cylinder residual gas mass value is determined by subtracting the first cylinder residual gas mass value from the cylinder residual gas mass base value, which is particularly easy to implement.

In some exemplary embodiments, as stated above, the cylinder residual gas mass base value is determined for a stationary operating state of the internal combustion engine. In this way, as stated above, the cylinder residual gas mass base value may be determined particularly accurately using, for example, a complex and thus highly accurate model, which in some exemplary embodiments takes place outside the engine control unit.

In some exemplary embodiments, in addition an instantaneous exhaust gas temperature is determined, and the residual gas mass in the cylinder is calculated as a function of the instantaneous exhaust gas temperature. It is thus possible to calculate the residual gas mass during dynamic operation.

In addition, an instantaneous first cylinder residual gas mass value may be calculated based on the first cylinder residual gas mass value and the instantaneous exhaust gas temperature, and/or an instantaneous second cylinder residual gas mass value may be calculated based on the second cylinder residual gas mass value and the instantaneous exhaust gas temperature. The residual gas mass in the cylinder may then be calculated based on the first instantaneous cylinder residual gas mass value and the second instantaneous cylinder residual gas mass value, by means of which the residual gas mass during dynamic operation is calculated.

As also mentioned above, in some exemplary embodiments the first cylinder residual gas mass value may be determined based on a predefined model, wherein the predefined model that is used to obtain the cylinder residual gas mass base value may be more complex than the predefined model that is used to determine the first cylinder residual gas mass value. The first cylinder residual gas mass value is calculated in the engine control unit, for example, and the cylinder residual gas mass base value is calculated in advance using a fairly powerful computer and then stored in the engine control unit for subsequent use. An accurate calculation of the residual [gas] mass in the cylinder is thus possible without, for example, equipping the engine control unit with regard to its computing power and memory capacity for complex calculations, as is necessary for the cylinder residual gas mass base value.

The procedure may be summarized mathematically as follows:

The residual gas mass $m_{RG0}$ in the cylinder during stationary operation at an exhaust gas temperature $T_0$ which results during stationary operation is composed of the first cylinder residual gas mass value $m_{tot0}$ in the cylinder clearance volume and the second cylinder residual gas mass value $m_{res0}$, which corresponds to the residual gas mass flowing back due to the valve overlap:

$$m_{RG0} = m_{tot0} + m_{res0}$$

The residual gas mass $m_{RG0}$, as described above, is determined externally, for example, and in advance based on a complex model, using a powerful computer, wherein the complex model is supplied with parameters, as mentioned above, that are determined by operating the internal combustion engine under standard stationary test stand conditions.

The same relationship is obtained for dynamic operation; i.e., the (instantaneous) residual gas mass $m_{RG1}$ in the cylinder during dynamic operation, at an exhaust gas temperature $T_1$, is composed of the first (instantaneous) cylinder residual gas mass value $m_{tot1}$ in the cylinder clearance volume and the second (instantaneous) cylinder residual gas mass value $m_{res1}$, which corresponds to the residual gas mass flowing back due to the valve overlap:

$$m_{RG1} = m_{tot1} + m_{res1}$$

The first (instantaneous) cylinder residual gas mass value $m_{tot1}$ and the second (instantaneous) cylinder residual gas mass value $m_{res1}$ exhibit physically different transformation behaviors:

$$m_{tot1} = m_{tot0} \cdot \frac{T_0}{T_1}$$

$$m_{res1} = m_{res0} \cdot \sqrt{\frac{T_0}{T_1}}$$

Based on these formulas, the first (instantaneous) cylinder residual gas mass value $m_{tot1}$ and the second (instantaneous) cylinder residual gas mass value $m_{res1}$ may be derived from the associated values that were determined during stationary operation, wherein the exhaust gas temperature $T_0$, during stationary operation and the (instantaneous) exhaust gas temperature $T_1$, during dynamic operation are known.

The instantaneous residual gas mass $m_{RG1}$ during dynamic operation may thus be calculated.

In addition, a correction factor $f_{kor}$ may be calculated:

$$f_{kor} = \frac{m_{RG1}}{m_{RG0}}$$

In some exemplary embodiments, the correction factor may likewise be determined in advance and stored in the engine control unit for certain exhaust gas temperature values, for example. As a result, in some exemplary embodiments a complex calculation during dynamic operation is not necessary, and the instantaneous residual gas quantity $m_{RG1}$ may be easily obtained, for example, by applying the correction factor $f_{kor}$ to the residual gas quantity $m_{RG0}$ that was likewise stored in the engine control unit and determined during stationary operation.

Some exemplary embodiments relate to a controller, in particular an engine control unit, for an internal combustion engine of a motor vehicle, including a processor and a memory, wherein the controller is configured for carrying out the described method.

Some exemplary embodiments further relate to a motor vehicle having an internal combustion engine with cylinder(s) and such a controller.

BRIEF DESCRIPTION OF THE DRAWINGS

Exemplary embodiments of the invention are now described by way of example, with reference to the appended drawings, in which.

DETAILED DESCRIPTION OF THE INVENTION

Figure 1:
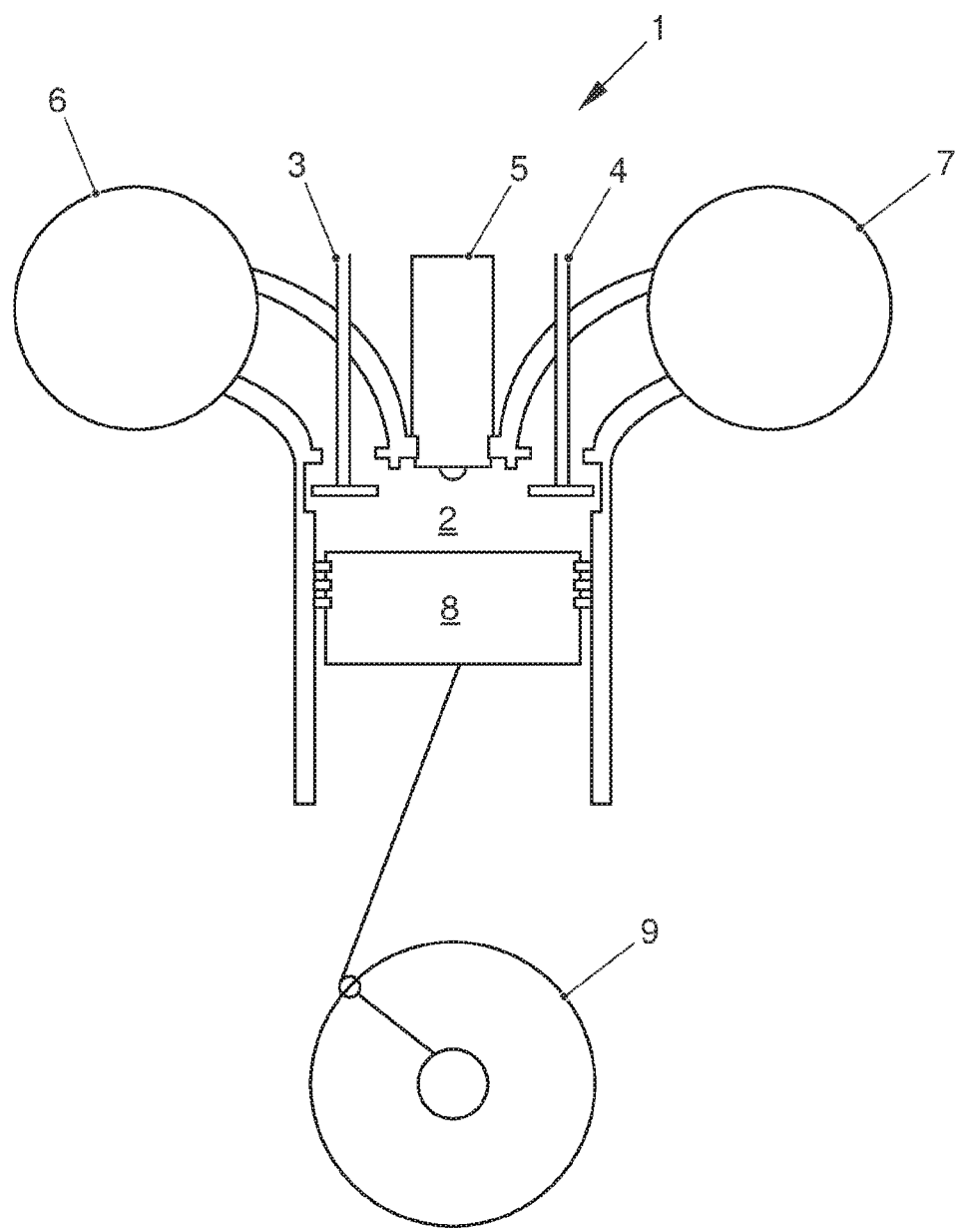
FIG. 1 schematically shows an exemplary embodiment of a cylinder during a valve overlap.

An exemplary embodiment of a cylinder 1 of an internal combustion engine is schematically illustrated in FIG. 1.

The cylinder 1 has a combustion chamber 2 in which fuel that is injected via an injector 5 is combusted. The cylinder 1 has an intake valve 3 that is coupled to an intake manifold 6, from which combustion air passes into the cylinder 1 through the intake valve 3 and into the combustion chamber 2. In addition, the cylinder 1 has an exhaust valve 4 that is coupled to an exhaust manifold 7, through which exhaust gas is conducted from the combustion chamber 2 into the exhaust manifold 7. In addition, a cylinder piston 8 is present which is driven by a crankshaft 9, as is basically known to those skilled in the art.

In FIG. 1 the cylinder 1 is illustrated in a valve overlap position in which the intake valve 3 and the exhaust valve 4 are both open, so that exhaust gas may pass from the exhaust manifold 7, through the combustion chamber 2, and into the intake manifold 6, and from there in a subsequent work cycle may flow back out of the intake manifold 6 into the combustion chamber 2.

Figure 2:
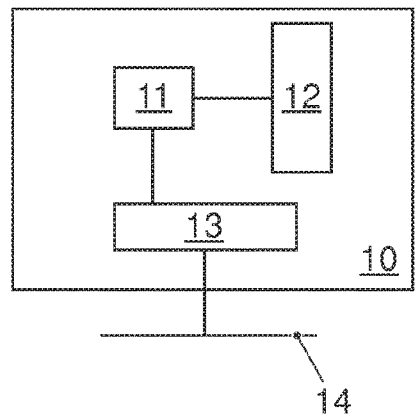
FIG. 2 schematically shows an engine control unit.
Figure 3:
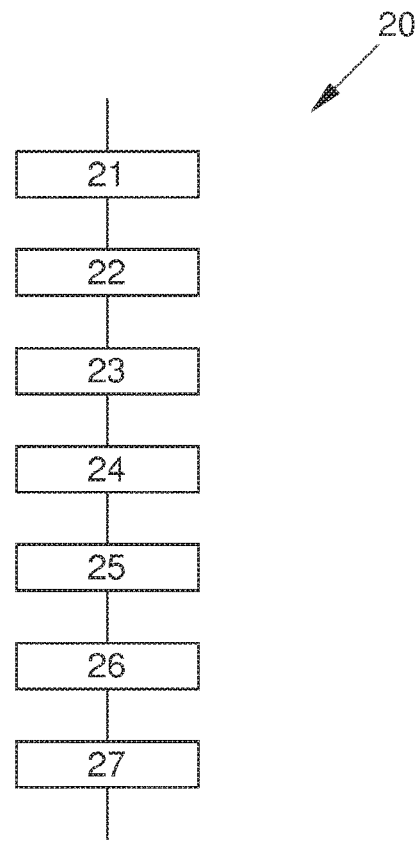
FIG. 3 shows a flow chart of a method for calculating a residual gas quantity.

FIG. 2 illustrates an engine control unit 10 that is configured for carrying out the method described herein for calculating a residual gas mass in a cylinder of an internal combustion engine, as also described in greater detail below in conjunction with FIG. 3.

The engine control unit 10 has a processor 11, a memory 12, and an interface 13 for communicating with a bus system 14. By way of example, the interface 13 here is a CAN bus interface and the bus system 14 is a CAN bus system, without the present invention being limited in this regard.

The engine control unit 10 carries out a method 20 (FIG. 3) for calculating a residual gas mass in a cylinder, such as the cylinder 1 in FIG. 1. The engine control unit 10 is configured in such a way that the processor 11 carries out the method described herein.

At 21, the engine control unit 10 obtains a cylinder residual gas mass base value that is based on a predefined model, as discussed above. The predefined model is complex, and the cylinder residual gas mass base value is determined by stationarily operating the internal combustion engine on a test stand under standard conditions. Parameters thus obtained, for example also the stationary exhaust gas temperature ($T_0$), are used for the model in order to determine the cylinder residual gas mass base value ($m_{RG0}$) for stationary operation as precisely as possible. The cylinder residual gas mass base value is stored in the memory 12, and the processor 11 may obtain this value by retrieving it from the memory 12.

At 22, the engine control unit 10 determines a first cylinder residual gas mass value ($m_{tot0}$), which indicates a cylinder residual gas mass remaining in the cylinder clearance volume after an expulsion of exhaust gas, as already described above. In the present case, the first cylinder residual gas mass value is determined for the exhaust gas temperature ($T_0$) determined during stationary operation. This value may, for example, also be stored in advance in the memory 12 or dynamically determined based on a predefined model.

At 23, the engine control unit 10 determines a second cylinder residual gas mass value ($m_{res0}$), which indicates a cylinder residual gas mass flowing into the cylinder 1 due to a valve overlap of the intake valve 3 and the exhaust valve 4, wherein the second cylinder residual gas mass value is determined based on the cylinder residual gas mass base value and the first cylinder residual gas mass value, in that the second cylinder residual gas mass value is determined by subtracting the first cylinder residual gas mass value from the cylinder residual gas mass base value.

At 24, the engine control unit 10 calculates an instantaneous exhaust gas temperature ($T_1$) during dynamic operation by retrieving this temperature either via the bus system 14 (from a corresponding temperature sensor, for example) and/or by calculating it using a model provided in the engine control unit 10.

At 25, the engine control unit 10 calculates an instantaneous first cylinder residual gas mass value ($m_{tot1}$), based on the first cylinder residual gas mass value ($m_{tot0}$) and the instantaneous exhaust gas temperature ($T_1$), as also described above.

At 26, the engine control unit 10, calculates an instantaneous second cylinder residual gas mass value ($m_{res1}$), based on the second cylinder residual gas mass value ($m_{res0}$) and the instantaneous exhaust gas temperature ($T_1$), as also described above.

At 27, the engine control unit 10 calculates the instantaneous residual gas mass ($m_{RG1}$) in the cylinder 1, based on the first instantaneous cylinder residual gas mass value ($m_{tot1}$) and the second instantaneous cylinder residual gas mass value ($m_{res1}$), as also described above.

The method 20 may also be carried out for each cylinder of an internal combustion engine.

LIST OF REFERENCE NUMERALS

1 cylinder
2 combustion chamber
3 intake valve
4 exhaust valve
5 injector
6 intake manifold
7 exhaust manifold
8 cylinder piston
9 crankshaft
10 engine control unit
11 processor
12 memory
13 interface
14 bus
20 method for calculating a residual gas mass in a cylinder of an internal combustion engine
21 obtaining a cylinder residual gas mass base value
22 determining a first cylinder residual gas mass value
23 determining a second cylinder residual gas mass value
24 determining an instantaneous exhaust gas temperature
25 calculating a first instantaneous cylinder residual gas mass value
26 calculating a second instantaneous cylinder residual gas mass value
27 calculating the residual gas mass in the cylinder

The invention claimed is:

1. A method for calculating an instantaneous residual gas mass $m_{RG1}$ in a cylinder of an internal combustion engine, wherein the cylinder has at least one intake valve and one exhaust valve, comprising:

obtaining a cylinder residual gas mass base value $m_{RG0}$ for a stationary operating state of the internal combustion engine at an exhaust gas temperature $T_0$, wherein the cylinder residual gas mass base value $m_{RG0}$ is based on a predefined model;

determining a first cylinder residual gas mass value $m_{tot0}$ that indicates a cylinder residual gas mass remaining in the cylinder clearance volume after an expulsion of exhaust gas;

determining a second cylinder residual gas mass value $m_{res0}$ that indicates a cylinder residual gas mass flowing into the cylinder due to a valve overlap of the intake valve and the exhaust valve, wherein $m_{RG0}=m_{tot0}+m_{res0}$, and wherein the second cylinder residual gas mass value $m_{res0}$ is determined by subtracting the first cylinder residual gas mass value $m_{tot0}$ from the cylinder residual gas mass base value $m_{RG0}$;

determining an instantaneous exhaust gas temperature $T_1$; and calculating the instantaneous residual gas mass $m_{RG1}$ in the cylinder, based on a first instantaneous cylinder residual gas mass value $m_{tot1}$ and a second instantaneous cylinder residual gas mass value $m_{res1}$, wherein $m_{RG1}=m_{tot1}+m_{res1}$, wherein the first instantaneous cylinder residual gas mass value $m_{tot1}$ is calculated according to $m_{tot1}=m_{tot0}\times(T_0/T_1)$, and the second instantaneous cylinder residual gas mass value $m_{res1}$ is calculated according to $m_{res1}=m_{res0}\times\sqrt{T_0/T_1}$.

2. The method according to claim 1, wherein the first cylinder residual gas mass value is determined based on a predefined model.

3. A controller for an internal combustion engine of motor vehicle, including a processor and a memory, wherein the controller is configured for carrying out the method according to one of the preceding claims.

\* \* \* \* \*